United States Patent [19]

McGinnis et al.

[11] 4,143,408

[45] Mar. 6, 1979

[54] EXTERNAL SELECTOR AND INTERNAL CONTROLLER FOR FLEXIBLE DISC STACK

[75] Inventors: Bernard W. McGinnis; James A. Weidenhammer, both of Poughkeepsie, N.Y.

[73] Assignee: International Business Machines Corp., Armonk, N.Y.

[21] Appl. No.: 855,539

[22] Filed: Nov. 28, 1977

[51] Int. Cl.² ............................ G11B 5/60; G11B 5/82
[52] U.S. Cl. ......................................... 360/98; 360/99
[58] Field of Search ................... 360/98, 99, 137, 135, 360/105, 102–103, 86; 206/444

[56] References Cited

U.S. PATENT DOCUMENTS

| 3,936,880 | 2/1976 | McGinnis et al. | 360/99 |
| 4,011,590 | 3/1977 | Orlando | 360/99 |
| 4,011,591 | 3/1977 | Orlando | 360/99 |
| 4,019,204 | 4/1977 | Griffiths et al. | 360/99 |
| 4,051,541 | 9/1977 | McGinnis et al. | 360/98 |

OTHER PUBLICATIONS

IBM Technical Disclosure Bulletin, vol. 17, No. 1, Jun. 1974.

*Primary Examiner*—John H. Wolff
*Attorney, Agent, or Firm*—Douglas R. McKechnie

[57] ABSTRACT

A data storage device has a pressurized flexible disc stack. An external actuator creates a partial split allowing a transducer to read edge codings on the discs to locate a desired one. An internal controller controls the pressure within the center of the stack and defines a zone aligned with the actuator within which the pressure is maintained above the bistable range while locating the desired disc. Upon locating the desired disc, the pressure with the zone is dropped below the upper limit of the bistable range causing the partial split to open or expand into a full, stable separation allowing a read/write head to access the desired disc.

10 Claims, 1 Drawing Figure

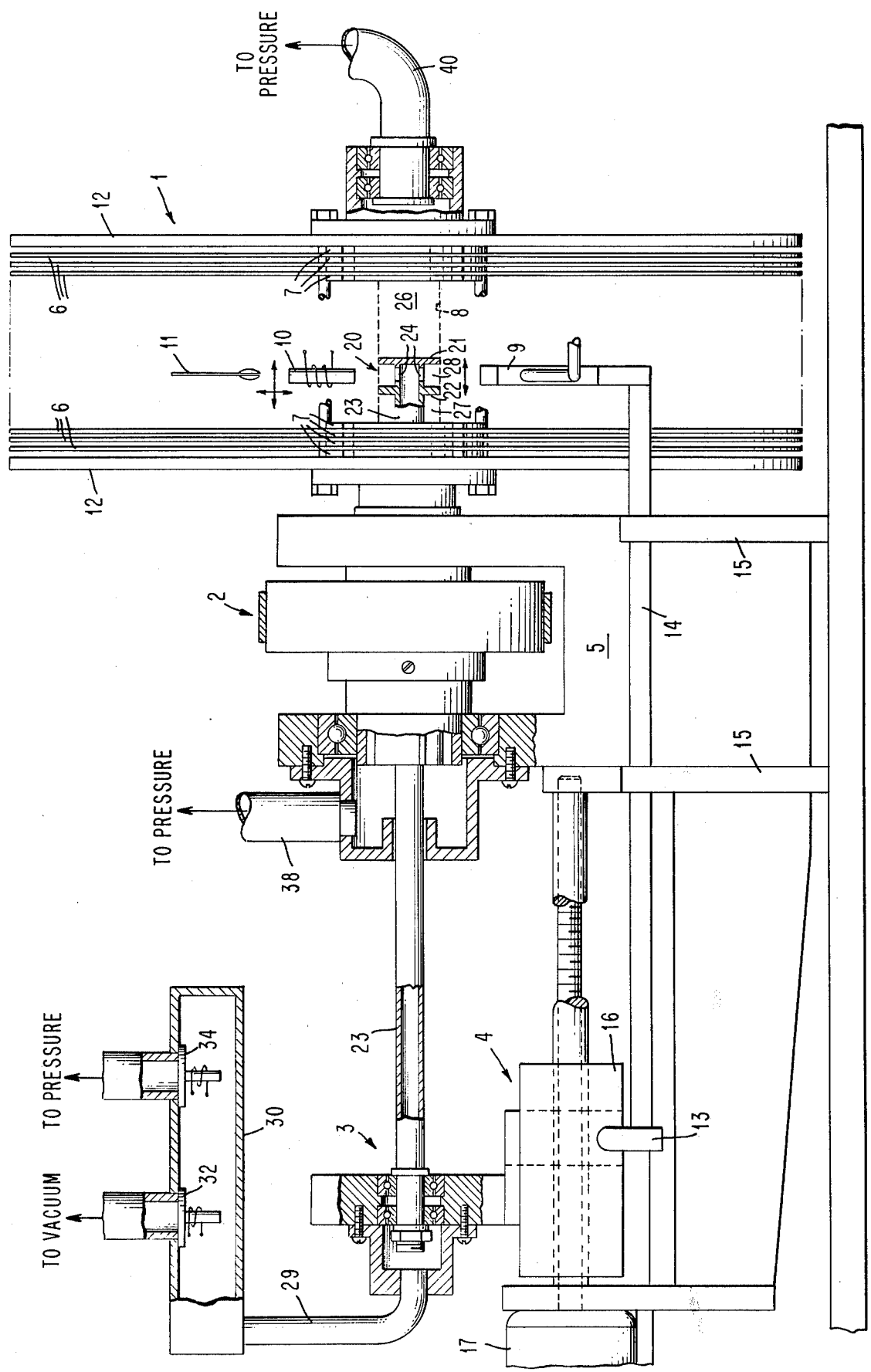

EXTERNAL SELECTOR AND INTERNAL CONTROLLER FOR FLEXIBLE DISC STACK

FIELD OF THE INVENTION

This invention relates to data storage devices of the type having a stack of flexible discs and, more particularly, to an improved arrangement for allowing external selection of a predetermined disc and internal control of the separation of discs to permit accessing the desired disc.

PRIOR ART

Within the prior art, many different designs are available presenting alternate ways to accomplish the flow of air through a flexible disc pack and to effect a full or stable separation between desired discs. Two such prior art designs are considered the most relevant to the present invention. First, U.S. Pat. No. 4,011,591 — Orlando et al. discloses a design wherein the separation of discs to allow a transducing head to be inserted into the stack, is achieved by internal action. In such design, the discs are axially spaced by radially ventilated spacers and a bore extends through the discs and the spacers. Disposed within the bore is a movable controller that includes two transverse plates and a circular nozzle actuator between the plates. Air is supplied under pressure outside of the plates within the bore to maintain radially adjacent discs in an above-bistable condition and a vacuum is applied to the space between the plates to create a bistable condition whereby a jet of air through the nozzle, applied through an adjacent ventilated spacer, causes the discs at either side of such spacer to fully separate in a stable fashion. A possible difficulty with this design is that in a stack having hundreds of discs, it is necessary to align the nozzle precisely with a given spacer and the build-up of manufacturing tolerances might interfere with aligning the nozzle with the correct spacer and hence lead to inaccuracy in the results.

Additionally, because of the extreme alignment requirements for proper interface selection, opening of the pack is often accompanied by excessive fluttering discs from side to side of the expanded separation. This action requires a relatively long settling period before a transducer can be safely inserted. Sometimes, the fluttering can cause a mis-selection when a fluttering disc settles on the wrong side of the expanded opening in the stack. Furthermore, the capacity of a stack of discs is somewhat limited because of the practical limitation of air flow in the restricted bore of the controller shaft with the circular nozzle.

Second, U.S. Pat. No. 4,051,541 — McGinnis et al. discloses a flexible disc pack assembly having a plurality of discs provided with a series of longitudinally extending inner bores through which air passes at either above bistable pressure or at a bistable pressure. An externally located actuator in the form of a nozzle directs a jet of air at the periphery of the discs and causes a partial split to occur when the pressure flowing through the disc assembly is above bistable. This allows a transducer to read edge-coded signals in order to locate the desired disc for which access is desired. Thereupon, the pressure is reduced within the bores of disc stack to bistable conditions whereupon the discs which were formerly only partially split pop open into a self-sustainable full split so that a read/write head can be inserted for accessing the desired disc. A problem with this type of stack assembly occurs because of the fact that when the pressure flowing through the axial bores creates the bistable condition, a jarring of the stack or external disturbance might cause several self-sustained full splits to occur.

SUMMARY OF THE INVENTION

One of the objects of the invention is to provide a data storage device, having a pressurized disc stack, with an internal mechanism for controlling the bistable/above bistable conditions within the assembly and an external actuator for accessing a desired one of discs within the stack.

Another object of the invention is to provide an externally actuated disc stack assembly in which only one sustainable full split or separation may occur at any given time.

Still another object of the invention is to provide an internal control mechanism similar to parts of the control mechanism disclosed in the above mentioned U.S. Pat. No. 4,011,591 with an external actuator such as disclosed in the above mentioned U.S. Pat. No. 4,051,541. It is believed that this new combination of elements is not obvious to a person of ordinary skill in the art for the following reasons. First, the patented designs represent alternate ways to accomplish a similar result, each way being different and not teaching or suggesting being combined in any way with the other. Second, the controller of the present invention is not directly found in either patent and hence is not an "old" element. U.S. Pat. No. 4,011,591 requires a nozzle in the space which, in the present invention, is open.

Briefly stated, the manner in which these and other objects of the invention are achieved is to provide a pressurized disc stack having a central bore in which is movably disposed a controller having two ends plates separated so as to define a zone. The pressure of air within the zone is controlled to selectively create above bistable conditions and bistable conditions or below-bistable conditions within a group of radially adjacent discs wherein only one self-sustaining split can be maintained at any give time. An external nozzle actuator is aligned with the zone and effects a partial split when the controller provides an above-bistable condition in the zone. During the partial split, an external transducer reads edge coded signals on the discs until a desired disc is located. Then, by reducing the pressure in the zone to below the upper limit of the bistable condition, the partial split expands to a full split that is self-sustainable and is wide enough to allow a read/write or transducing head to access the desired disc.

Other objects and advantages of the invention will be apparent from the following detailed description of a preferred embodiment of the invention taken in connection with the accompanying drawing which is a elevational view, partly in section, with portions removed and partially schematic, of a data storage device embodying the invention.

DETAILED DESCRIPTION

Referring now to the drawing, the data storage device there illustrated comprises a rotary flexible disc subassembly or stack 1 driven by a rotational drive and support subassembly 2. An actuator subassembly 3 is driven by a translational drive subassembly 4, the parts of the subassemblies 1-4 being mounted upon a stationary base 5. Stack 1 comprises a multiplicity of flexible discs 6 separated by a multiplicity of radially ventilated spacers 7. A bore 8 extends axially through the centers of discs 6 and spacers 7 and air can readily flow radially between discs 6, and through spacers 7 and bore 8.

A nozzle or actuator 9 is mounted adjacent the periphery of stack 1 and directs a jet of air on the periphery thereof. Actuator 9 cooperates with a transducer 10 during a partial split of the stack, described below, to allow transducer 10 to read edge coded marks on discs 6 so as to locate a predetermined one of the discs. When the desired disc, has been located, the flow of air from nozzle 9, in conjunction with the operation of controller 20, causes a full sustainable separation to take place between the desired disc and an adjacent disc allowing a read/write or transducing head 11 to be inserted into the stack alongside the desired disc for either reading information from or writing information onto the appropriate track of the disc. Nozzle 9, transducer 10 and head 11 and the manner in which they operate to detect and access a desired disc are described in detail in U.S. Pat. No. 4,051,541 — McGinnis et al., to which reference may be had for the more detailed description. Discs 6 and spacers 7 in stack 1 are confined between two rigid end plates 12. The number of discs in a stack is a matter of choice and as many of from several hundred to a couple of thousand discs may be contained therein.

In order to move actuator 9 to a desired longitudinal position adjacent the periphery of stack 1 and aligned with controller 20, actuator 9 is mounted on one end of a sliding rod 14 that is slidably mounted on supports 15 connected to base 5. The other end of rod 14 is connected by a member 13 to carriage 16 of drive 4 so that as the carriage 16 is translated, due to operation of a motor 17, member 13 and rod 14 move actuator 9 longitudinally along the edge of stack 1.

A controller 20 is disposed within bore 8 and comprises a pair of axially or longitudinally separated transverse plates 21 and 22 mounted on one end of a tube 23 that forms part of actuator 3. Radial holes 24 are formed in the end of tube 23 between plates 21 and 22, the end plate 21 being solid so that air can readily flow from the interior of tube 23 outwardly through holes 24. End plates 21 and 22 in conjunction with the interior walls of spacers 7 and disc 6, and bore 8, form an interior chamber or zone 28 between plates 21 and 22 and two axially displaced exterior chambers or zones 26 and 27 within bore 8 to either side of plates 21 and 22. The other end of tube 23 is open and communicates through a tube 29 with a plenum chamber 30 that is respectively connected through solenoid actuated valves 32 and 34 to a source of vacuum and to a source of pressure. Tube 29 is preferably flexible so as to allow actuator 3 and tube 23 to readily move without moving plenum 30.

Zone 27 communicates through interior passages with a tube 38 connected to a source of pressure and zone 26 similarly communicates through a tube 40 to the source of pressure, the interior passages being described in detail in the aforementioned U.S. Pat. No. 4,011,590.

The longitudinal length of zone 28, i.e., the distance between plates 21 and 22, is short enough so that only one partial split or stable separation or split, can occur at a time. This distance depends on the pack speed of rotation, the disc material, and the thicknesses of the discs and spacers. In an exemplary embodiment, the distance is 0.562 inches, for mylar discs of 1.2 mil thickness, spacers of 3.8 mil thickness, rotating at 1800 RPM.

Nozzle 9 is disposed directly radially outwardly from controller 20 in line with zone 28 and, since drive subassembly 4 is connected to both controller 20 and actuator 9, these elements move concurrently so as to occupy the same relative longitudinal positions. The pressure source to which tube 38 and 40 and plenum 30 are connected provides air at sufficient pressure to maintain the pneumatic conditions of the discs in an above-bistable condition whereas the vacuum source to which plenum 30 is connected is at a level to present a bistable condition or lower.

Except for elements 9, 10 and 11, which as previously indicated are disclosed in U.S. Pat. No. 4,051,541, and except for elements 13–15, controller 20 and elements 29, 30, 32 and 34, the remaining elements shown in the drawing are substantially the same as those shown in FIG. 1 of U.S. Pat. No. 4,011,490 — Orlando, to which reference may be had for a detailed description thereof.

During the operation of the data storage device, stack 1 is continuously rotated by drive 2. When it is desired to access a particular disc, drive 4 is actuated to move controller 20 and actuator 9 to the approximate position. Valve 34 is actuated so as to connect controller 20 to the source of pressure whereby the pressure in zones 26, 27 and 28 is above-bistable. The flow of air emitted from nozzle 9 thus is effective to produce only a partial split of the discs located radially inwardly thereof. Transducer 10 is used to read the edge markings on the discs. If the initial partial separation is not at the desired disc, drive 4 moves actuator 9 and controller 20 to the next disc spacing and the process of moving and reading is repeated until the desired disc is thus located. When the desired disc is located, valve 34 is deactuated and valve 32 is actuated to connect zone 28 to the vacuum source and create in zone 28 a pressure below the upper limit of the bistable condition. Thus, the flow of air from nozzle 9 causes the adjacent discs which were in a partial separation, to separate into a full stable or sustainable state whereupon head 11 can be used to access information on the desired disc. The stable separation will continue as long as the pressure in zone 28 is bistable. When it is desired to access another disc, valve 32 is deactugted and valve 34 is actuated thereby causing zone 28 to go from a bistable condition to an above-bistable condition whereupon the pack closes. The location and accessing process may then proceed as described above.

The basic principle of operation of a pressurized flexible disc stack is described in U.S. Pat. No. 3,936,880 — McGinnis et al. During operation, the internal stack pressure can be above-bistable, bistable or below-bistable. When the pressure is above-bistable, an external actuator such as a knife edge or an air jet, can produce only a partial split in the stack which remains split only so long as the actuating force is present. When the pressure is reduced, the upper limit of the bistable range is reached below which the pack will open into a full, stable separation during which time the actuating force can be removed. When the pressure is reduced even more, it falls below the lower limit of the bistable range into a "below-bistable" condition in which several random splits or openings will occur in the stack if such below-bistable conditions were maintained along the entire length of the stack. However, use can be made of a below-bistable condition to increase the speed at which the pack opens. Thus, after a desired disc has been located, zone 28 can be first connected to a "high" vacuum supplying a pressure in the "below-bistable" region to cause the partial split to rapidly become a full split. Once the pack is thus opened, zone 28 can be connected to a "low" vacuum supplying a pressure in the bistable region to maintain the stability of the split. Because of the short length of zone 28, the high vacuum affects only the partial split area and no other random splits or openings occur.

In the embodiment illustrated, actuator 9 is connected to the drive for moving controller 20. It should be obvious that the actuator could be controlled independently by a separate drive mechanism which would require synchronism between the movements of both the controller 20 and actuator 9 so as to position them radially opposite each other when it is desired to effect a stable separation.

It should be also obvious that other changes can be made in the details and arrangements of parts without departing from the spirit and scope of the invention as defined in the appended claims.

What is claimed is:

1. In a data storage device having a cylindrical rotary disc pack of flexible discs separated by radially ventilated spacers, said discs and spacers having an axial bore therethrough, the combination comprising:

an external actuator located adjacent to the outer periphery of said discs and being selectively operable to apply a force to create a partial split between a pair of adjacent discs;

means for moving said actuator longitudinally along said pack to a position adjacent a predetermined disc;

an internal controller disposed in said bore for movement therealong and having a pair of spaced plates extending transversely across said bore, said plates dividing said bore into an interior zone between said plates and into exterior zones outside of between said plates, said plates being spaced along the axis of said pack a distance sufficient to permit only one full stable separation between adjacent discs located radially outwardly of said interior zone;

means for moving said controller along said bore to a position where said interior zone is aligned directly radially inwardly of said actuator;

and means for controlling the flow of air through said pack comprising first means for delivering air to said exterior zones at above-bistable pressures to create above-bistable conditions relative to those discs located radially outwardly of said exterior zones, and second means selectively switchable between first and second controlling conditions for delivering air to said interior zone respectively at first and second pressures to respectively create an above-bistable condition and a lower pressure condition;

said second means being operable, when said interior zone is aligned radially inwardly of said actuator and said actuator is adjacent said predetermined disc, to allow said actuator to create said partial split at said predetermined disc when said second means is in said first controlling condition, and to cause such partial split to open, upon switching said second means from said first to said second controlling condition, into a full stable split permitting accessing of said predetermined disc.

2. The combination of claim 1 wherein said actuator comprises a nozzle directing a jet of air against the periphery of said pack.

3. The combination of claim 1 comprising detector means effective during said partial split to read edge coding means on said discs to locate said predetermined disc.

4. The combination of claim 3 comprising transducer means insertable into said pack during said full stable split to access said predetermined disc.

5. The combination of claim 4 wherein said second means is operative to deliver air at said first pressure during movement of said actuator to create a sweries of partial splits between successive ones of said discs until said detector means locates said predetermined disc, said second means being switched from said first to said second controlling conditions in response to locating said predetermined disc.

6. The combination of claim 5 wherein said second pressure is below a range of pressures creating bistable conditions in said interior zone.

7. The combination of claim 1 comprising means for simultaneously moving said actuator and said controller to radially aligned positions.

8. The combination of claim 7 wherein said last mentioned means comprises a single motor for moving both said actuator and said controller.

9. The combination of claim 1 wherein said second means for delivering air comprises selectively actuated valve means operative upon actuation thereof to switch from said first to said second controlling conditions.

10. The combination of claim 1 wherein said second pressure is below the upper limit of a range of pressures creating bistable conditions in said interior zone.

* * * * *